US012636789B2

(12) United States Patent
Corcodel et al.

(10) Patent No.: US 12,636,789 B2
(45) Date of Patent: May 26, 2026

(54) HIGH-ACCURACY TACTILE POSE ESTIMATION FOR ELECTRONIC CONNECTOR ASSEMBLY

(71) Applicant: Mitsubishi Electric Research Laboratories, Inc., Cambridge, MA (US)

(72) Inventors: Radu Ioan Corcodel, Brookline, MA (US); Antonia Bronars, Cambridge, MA (US); Devesh Jha, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 63 days.

(21) Appl. No.: 18/667,771

(22) Filed: May 17, 2024

(65) Prior Publication Data

US 2025/0353182 A1 Nov. 20, 2025

(51) Int. Cl.
*B25J 9/16* (2006.01)
*G06T 7/00* (2017.01)
(Continued)

(52) U.S. Cl.
CPC ............. *B25J 9/1694* (2013.01); *G06T 7/001* (2013.01); *G06T 7/20* (2013.01); *G06T 7/55* (2017.01);
(Continued)

(58) Field of Classification Search
CPC ...... B25J 9/1694; B25J 9/1669; B25J 9/1687; B25J 9/1612; B25J 15/0028; B25J 15/026; G06T 7/001; G06T 7/20; G06T 7/55; G06T 7/74; G06T 2207/10024;

G06T 2207/10028; G06T 2207/30164; G06T 2207/30241; G05B 19/41805; G05B 2219/40625; G05B 2219/40569;
(Continued)

(56) References Cited

U.S. PATENT DOCUMENTS 11,667,039 B2 * 6/2023 Kuppuswamy ....... G01L 5/0061
                                                    702/41
2021/0031368 A1 * 2/2021 Drumwright ........ B25J 15/0038
2024/0120697 A1 * 4/2024 Einav ................... B25J 15/0066

FOREIGN PATENT DOCUMENTS

CN       115719385 A * 2/2023
CN       117934721 A * 4/2024 ........... G06N 3/0455

* cited by examiner

*Primary Examiner* — Truc M Do
*Assistant Examiner* — Noah W Stiebritz
(74) *Attorney, Agent, or Firm* — Gene Vinokur

(57) ABSTRACT

A pose controller is provided for controlling a pose of an object to assemble with a mating object by a gripper of a robot arm. The pose controller includes an interface configured to receive tactile signals from the tactile sensors and transmit a control signal to the actuators, a processor, and a memory, in association with the processor, configured to store a precomputed set of tactile depth images and instructions of computer-implemented method. The instructions cause the processor to perform steps of computing measured tactile depth images from the received tactile signals, refining the pose of the object by matching between the precomputed set of tactile depth images and the measured tactile depth images by, generating a gripper trajectory command based on the refined pose of the object and a target pose of the object, and controlling the actuators of the robot arm according to the gripper trajectory.

14 Claims, 8 Drawing Sheets

(51) Int. Cl.
     *G06T 7/20*         (2017.01)
     *G06T 7/55*         (2017.01)
     *G06T 7/73*         (2017.01)

(52) U.S. Cl.
     CPC ...... *G06T 7/74* (2017.01); *G05B 2219/40032*
            (2013.01); *G05B 2219/40627* (2013.01); *G06T*
                *2207/10024* (2013.01); *G06T 2207/10028*
            (2013.01); *G06T 2207/30164* (2013.01); *G06T*
                        *2207/30241* (2013.01)

(58) Field of Classification Search
     CPC ........... G05B 2219/40627; G05B 2219/39084;
                G05B 2219/45064; G01B 9/02031
     See application file for complete search history.

P1

P2

P3

| | Insertion Success Rate (/20) | Pose Error (mm) | Discrete Pose Error (mm) | Peak Insertion Force (N) | Cycle Time (s) |
|---|---|---|---|---|---|
| M-Connector | 20 | 0.63 mm | 0.58 mm | 12.17 N | 41.69 s |
| Six | 20 | 0.58 mm | 1.67 mm | 16.05 N | 50.87 s |
| Four | 19 | 0.22 mm | 2.39 mm | 6.05 N | 41.99 s |
| Black | 19 | 0.99 mm | 1.66 mm | 12.04 N | 49.63 s |

FIG. 7

| | Depth2Pose | ICP | Single Sensor |
|---|---|---|---|
| M-Connector | 10 (0.59 mm) | 2 (11.13 mm) | 5 (6.00 mm) |
| Six | 0 (1.71 mm) | 0 (15.67 mm) | 0 (0.89 mm) |
| Four | 0 (2.39 mm) | 2 (14.74 mm) | 10 (0.51 mm) |
| Black | 0 (1.50 mm) | 0 (17.40 mm) | 1 (22.33 mm) |

FIG. 8

HIGH-ACCURACY TACTILE POSE ESTIMATION FOR ELECTRONIC CONNECTOR ASSEMBLY

TECHNICAL FIELD

The present invention relates generally to a system and method for controlling a pose of an object to assemble with a mating object.

BACKGROUND

Autonomous assembly is a key problem in robotic manipulation, and despite decades of research, it remains open due to lack of generality for insertion of tight tolerance assemblies. The difficulty lies in estimating accurately the 3D pose of the two mating components to a precision greater than the tolerance of the assembly. Approaches that rely on visual 3D pose estimation may be insufficient for assemblies with very tight tolerances and small parts; in these scenarios, even the size of the mating components is on the order of the error of currently proposed solutions. Furthermore, in the presence of pose misalignment, mating parts can end up in a contact state that is difficult to recover from. The most common approach for resolving contact formations during assembly is by making use of wrench measurements from Force-Torque (F/T) sensors or tactile sensors. However, these contact formations are partially observable, and disambiguating the correct pose can be extremely challenging.

Existing approaches to robotic assembly can be divided into two prevailing methodologies. Pose-based approaches have leveraged search patterns and compliance to successfully insert arbitrary, simple geometries, even when the assembly tolerance is tighter than the accuracy of the pose estimate. These search patterns, however, rely on traversing a sequence of simple contact states that may not exist for complicated geometries. Alternatively, deep reinforcement learning-based approaches (DRL) can potentially succeed with more complex geometries, but face other challenges like sample efficiency and generalization.

Therefore, there is a need to develop a system and method for accurately controlling a pose of an object to assemble with a mating object.

SUMMARY OF THE INVENTION

Some embodiments of the present invention provide a system and method for solving the problem of robotic assembly of consumer-grade electronic connectors (FIG. 1), which requires inserting small parts grasped in arbitrary poses under tight assembly tolerances. We propose a solution based on high-accuracy pose estimation with image-based tactile sensors co-located at the gripper fingers. Image-based tactile sensors are uniquely situated for high-accuracy pose estimation because they provide a high-resolution view of the object geometry after the grasp, and expose features that are difficult to perceive with external vision systems. Furthermore, our proposed method is capable of successfully assembling industrial connectors when used with a simple impedance controller during insertion, circumventing the challenge of recovering from contact formations.

In some cases, the system using this method relies on access to the object CAD model, which is a reasonable assumption in industrial contexts, and is general in other important ways; for example, it is applicable to arbitrarily complex object geometries, it is agnostic to the initial grasp, and can account for post-grasp slip.

Our method addresses the following technical issues:

Development and implementation of a high-accuracy tactile pose estimator for consumer-grade electronic connectors Online tracking and pose refinement while the connector is in the grasp of a robot gripper Hardware demonstration of force-feedback insertion leveraging an impedance controller with no additional search strategy on several industrial connectors.

Some embodiments of the present invention reflect model-based approaches for robotic assembly consisting of pose estimation, online tracking, and finalized by a scripted search pattern or compliant control to perform the robotic insertions with tolerance tighter than the estimation accuracy. Search patterns are demonstrably effective in the simple case of cylindrical peg and hole insertion, but do not generalize to complex geometries. Existing approaches relaxes the assumption of cylindrical pegs and holes somewhat, introducing an insertion algorithm for convex objects based on traversing contact formations with impedance control. Other approaches can handle simple convex parts, by tracking known objects, given by a CAD model, through RGB-D images, then relying on a search strategy and mechanical compliance to facilitate insertion. RGB-D cameras can also be mounted in the wrist of the robot in an effort to avoid the search strategy and instead to rely on increasingly accurate state estimation. These methods leverage oriented keypoints as the state representation, and specify manipulation goals as twists and wrenches about such keypoints. They, however, restrict their evaluation to simple cylindrical geometries or imprecise tasks. Furthermore, their method relies on visual perception from a wrist-mounted camera, and therefore cannot handle small objects which are occluded by the grasp, nor recover from slipping within the grasp.

Reinforcement learning, too, has been successful at inserting simple geometries. Reinforcement learning even succeeds for more complicated geometries, like industrial connectors, where simple hand-designed search strategies typically fail. Successful policies for high-precision industrial assembly have been trained with both real-world data, and in simulation. Learning policies from real-world data is expensive and time-consuming, and consequently much effort has gone into devising methods that improve sample efficiency. Two popular approaches for improving sample efficiency are blending learning from demonstrations with residual reinforcement learning, and meta-reinforcement learning. Alternatively, methods trained in simulation have less stringent requirements for sample efficiency, but must contend with the challenge of sim-to-real transfer. Most methods require careful domain randomization, fine-tuning with real data, or even complete retrain in in the real world. Furthermore, many reinforcement learning methods rely on access to the (noised) relative pose to the goal. This implies that the policy is compatible only with a single initial grasp, and cannot easily recover from the object slipping within the grasp. In fact these strategies exhibit slipping within the grasp as a primary failure mode of their controller.

According to some embodiments of the present invention, a pose controller is provided for controlling a pose of an object to assemble with a mating object by a gripper of a robot arm having actuators controlled by a robot controller, the gripper including two fingers integrating tactile sensors contacting the object. The pose controller may include an interface configured to receive tactile signals from the tactile sensors and transmit a control signal to the actuators; processor; and a memory, in association with the processor, configured to store a precomputed set of tactile depth images and instructions of computer-implemented method that cause the processor to perform steps of: computing measured tactile depth images from the received tactile signals; refining the pose of the object by matching between the precomputed set of tactile depth images and the measured tactile depth images by a point-to-plane iterative closest point (ICP) algorithm; generating a gripper trajectory command based on the refined pose of the object and a target pose of the object, wherein the target pose is aligned against the mating object with a nominal distance above the mating object; and controlling the actuators of the robot arm according to a gripper trajectory by transmitting the gripper trajectory command to the robot controller.

Further, some embodiments of the present invention provide a computer-implemented method for controlling a pose of an object to assemble with a mating object by a gripper of a robot arm having actuators, the gripper including two fingers integrating tactile sensors contacting the object. The computer-implemented method may include steps of receiving tactile signals from the tactile sensors and transmit a control signal to the actuators; providing a memory storing a precomputed set of tactile depth images: computing, using a processor, measured tactile depth images from the received tactile signals; refining the pose of the object by matching between the precomputed set of tactile depth images and the measured tactile depth images by a point-to-plane iterative closest point (ICP) algorithm; generating a gripper trajectory command based on the refined pose of the object and a target pose of the object, wherein the target pose is aligned against the mating object with a nominal distance above the mating object; and controlling the actuators of the robot arm according to a gripper trajectory by transmitting the gripper trajectory command to a controller of the actuators.

Further, some embodiments are based on recognition that for the tactile pose estimation, the image-based tactile sensors are particularly useful for pose estimation when high-accuracy is a requirement, because they provide high-resolution information about the object pose throughout manipulation. They have been used to track drift from a known initial pose, build tactile maps and localize the object within them, and estimate the object pose from a sequence of tactile images. Other work has combined tactile sensing with vision to resolve ambiguity that can arise from tactile sensing alone. Only a limited number of other works have investigated estimating object pose from a single tactile image.

Some embodiments of the present invention provide a system and method for assembly of industrial grade connectors, enabled by high-accuracy tactile pose estimation. Model-based approaches to assembly that rely on pose estimation are appealing for their simplicity and comparatively fast cycle times. They are, however, generally limited to simple geometries or assemblies with generous tolerances. We overcome this limitation by proposing a two-phase tactile pose estimation approach that is effective for industry-relevant objects and tight assembly tolerances. First, we match observed tactile depth images to a precomputed set of simulated tactile depth images. Next, we refine the pose estimate beyond the discretization resolution of the set using non-linear optimizations such as ICP or inference. We achieve sub-millimeter pose estimation accuracy on several industrial connectors. Our key insight is that high accuracy pose estimation puts objects within the basin of attraction of a simple impedance controller, preventing the robot from encountering insolvable contact states and eliminating the need for search or specialized insertion algorithms. This enables high-tolerance assembly of arbitrarily shaped objects with a very simple controller. We evaluate our approach on real-world insertion of four connectors, and report insertion success rates of 95-100%.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the following identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

FIG. 7 shows some experimental results of Insertion Performance, according to embodiments of the present invention;

FIG. 8 shows some examples of Insertion Ablation Experiments according to some embodiments of the present invention;

DETAILED DESCRIPTION OF THE PREFERRED EMBODIMENTS

The present invention relates generally to power distribution systems, and more particularly to resilient distribution system infrastructure planning. The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Figure 1:
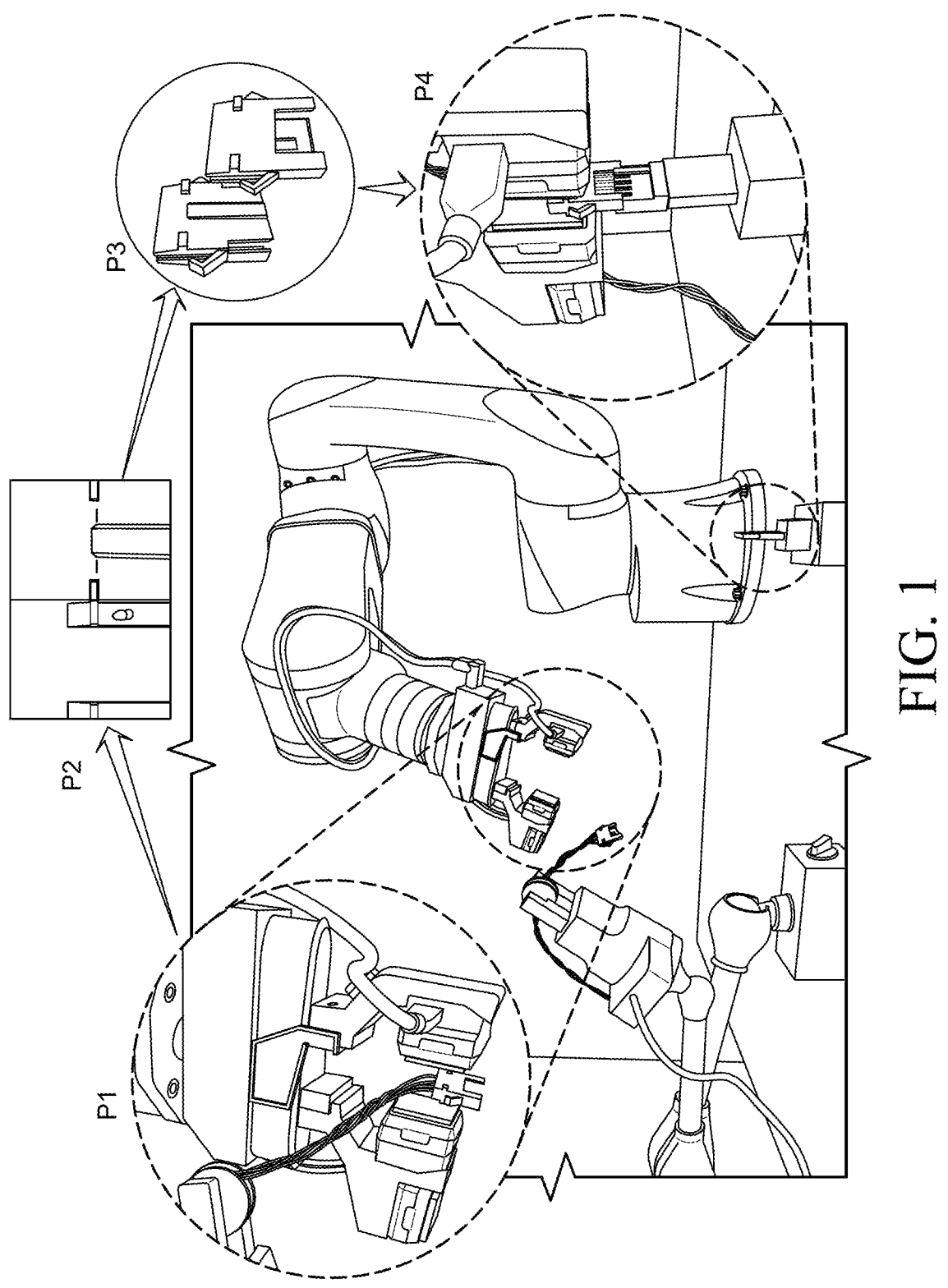
FIG. 1 is an example illustrating a robot arm performs a robotic assembly of consumer-grade electronic connectors, according to embodiments of the present disclosure.

FIG. 1 is an example illustrating a robot arm performs a robotic assembly of consumer-grade electronic connectors, according to embodiments of the present disclosure.

Electronic Connector Insertion. In a typical connector retrieval and insertion task, the robot is handed a connector-terminated cable in an arbitrary orientation (P1). Our method relies on image-based tactile sensors co-located at the gripper fingers to measure the contact imprint (P2) and estimate the relative pose between the gripper and the object with high accuracy (P3). The robot then aligns the in-hand connector with another mating connector situated in the robot's workspace in a known pose, and finally, the robot performs a force-controlled insertion (P4).

Matching reconstructed tactile depth images to a grid of simulated tactile depth images is performed by comparing distances in embedding space. The P1 rectangle represents the embedding of the observed depth image, while the two P2 rectangles represent the precomputed and stored embeddings of the simulated depth images.

Problem Formulation

Some embodiments address the task of industrial connector insertion via high-accuracy tactile pose estimation. We rely on several assumptions in formulating this problem:

1. Connectors are rigid with known 3D models.
2. We make contact with symmetry-breaking features of the connector, such that the connector pose is theoretically possible to disambiguate with tactile images
3. Connector goal poses are known a priori
4. The robot arm is deployed so that it grasps the connector, but the object pose estimation algorithm does not consume any information used to deploy the arm.

Figure 2:
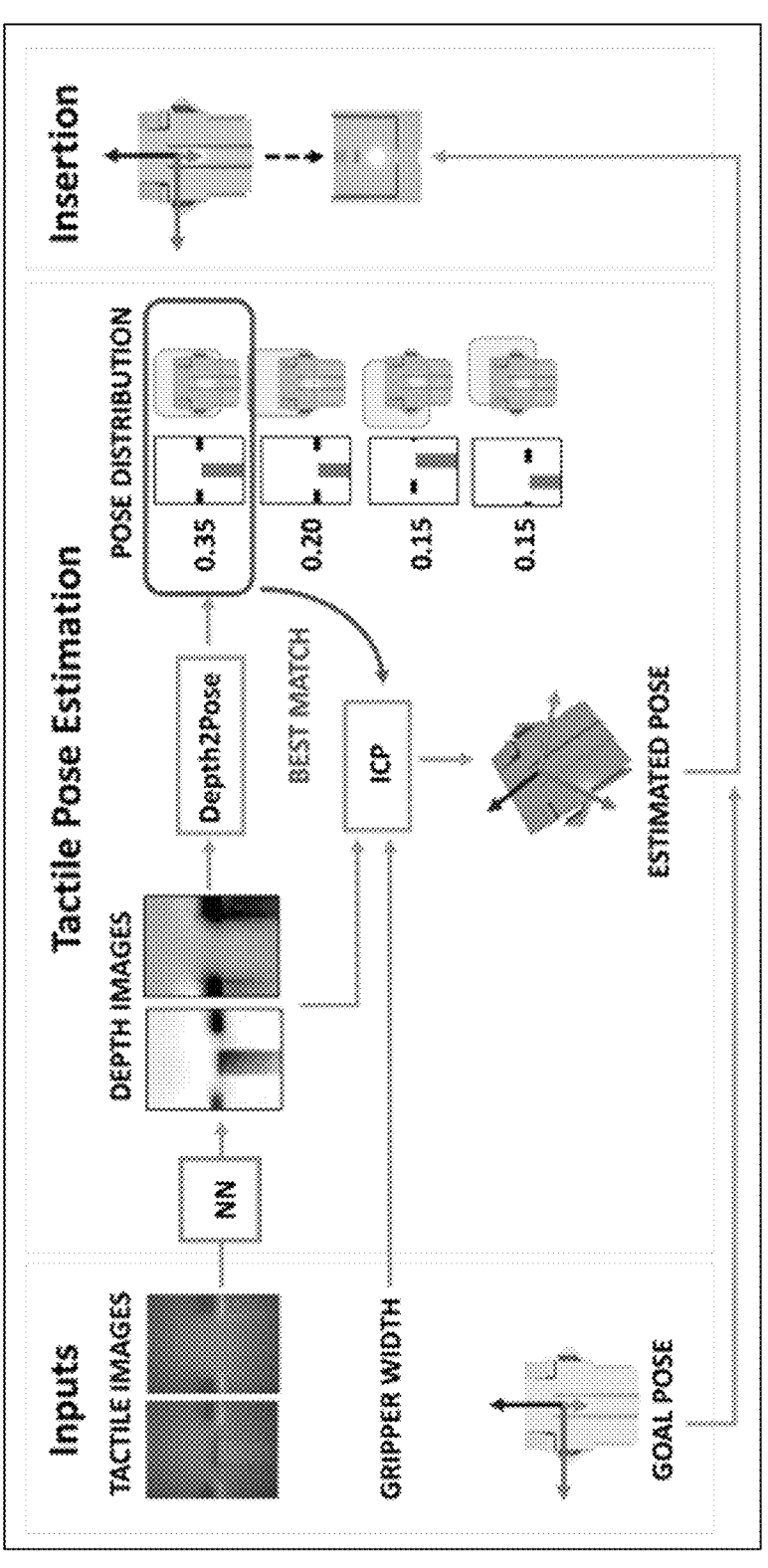
FIG. 2 shows an illustration of system overview, according to embodiments of the present disclosure.

FIG. 2 shows an example of a system overview, according to some embodiments of the present invention. In the figure, for given tactile images, robot proprioception (gripper width), and the connector goal pose in the world frame. Our method can estimate the connector pose with high-accuracy then inserts it with simple impedance control. We formulate tactile pose estimation as a two-step problem. First, we match observed grasps against a grid of possible simulated grasps, but using full tactile depth images rather than binary masks over the region of contact. Then, we use the object pose corresponding to the best match on the grid to initialize a point-to-plane Iterative Closest Point (ICP) algorithm, and refine the pose estimate beyond the discretization resolution of the grid. We finally insert the connector using a simple impedance controller.

Global Tactile Pose Tracking

We first infer tactile depth images from RGB tactile images. RGB tactile images are created by illuminating the surface of a gel pad with three colors of LEDs. When an object comes in contact with and deforms the surface of the gel sensor, it changes the color and intensity of light reaching the camera in a way that can be directly mapped to the surface normals of the contact geometry. We rely on the GelSight Inc. implementation of depth reconstruction, in which a small pre-trained fully connected neural network (agnostic to the sensor instance) is used to extract surface normals from RGB tactile images, then Poisson reconstruction is performed on the inferred surface normals to obtain the depth images.

Matching to the Discrete Grid.

We use a custom simulator to return full tactile depth images rather than binary masks over the region of contact. In the simulator, a virtual depth camera is placed at the origin and aligned with the z-axis. An object is posed relative to the virtual depth camera such that all points are a distance d or greater from the origin, where d is a function of the sensor geometry and represents the distance between the camera and the sensor surface. We then simulate a depth image of the scene that matches the representation convention of the reconstructed depth images from the real tactile sensor. We subtract $d+\Delta d$ from each pixel of the depth image, where $\Delta d$ represents the penetration depth of the sensor, and floor all positive values to zero. This results in a simulated depth image in which the point of maximum penetration has a pixel value of $-\Delta d$, and any points that are farther than $\Delta d$ along the z-axis from the point of maximum penetration are considered out of contact with the sensor and have a pixel value of zero.

We then build a grid of possible grasps on the object, starting by manually specifying a list of grasp faces (encoded as the transformations that bring the normal direction of the faces of interest in line with the z-axis). We sample grasps with 2.5 mm of translational resolution and 6 degrees of rotational resolution (about the grasp axis), and save the transformation, simulated depth images for each of the two fingers, and the gripper opening for each grasp.

Figure 3:
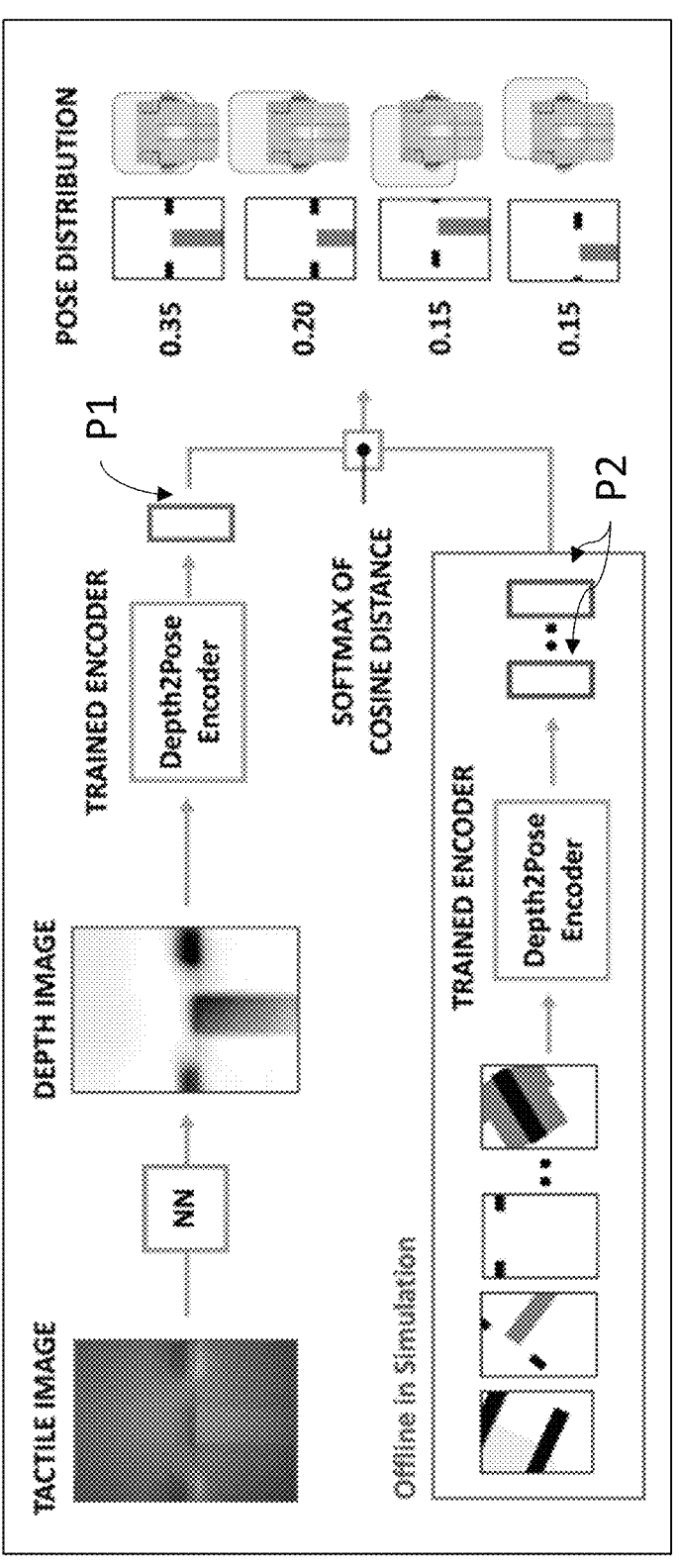
FIG. 3 shows the architecture of our Depth2Pose Matching process which matches reconstructed tactile depth images to a grid of simulated tactile depth images, according to some embodiments of the present invention.

We learn an object-dependent function in simulation to match observed tactile depth images against the precomputed set of tactile depth images, using supervised learning. Because the encoders are trained on simulated data, we rely on a small amount of domain randomization in the form of rendering tactile depth images at a range of penetration depths, in order to ease the sim-to-real gap. FIG. 3 shows the architecture of our Depth2Pose Matching process which matches reconstructed tactile depth images to a grid of simulated tactile depth images, according to some embodiments of the present invention.

The key idea, is that the encoder is trained to map tactile depth images into a representational space such that similar poses are near to each other, and dissimilar poses are far from each other. At test time, we compute the encoding of an observed tactile image, and take the softmax of the cosine distance between the observed encoding and the pre-computed encodings of each of the grid images. This $N \times 1$ vector, where N is the size of the grid, serves as a discrete distribution over object poses. Finally, we take as the best match the grid element which maximizes the joint likelihood of three distributions: the distributions coming from the two tactile depth images, and a Gaussian centered around the measured gripper opening with a standard deviation of 3 mm. We name this portion of the approach.

ICP. The second step of pose estimation involves refining the pose estimate beyond the discretization of the grid using ICP. We transform the tactile depth images from each of the two fingers of the parallel jaw gripper into a single, fused point cloud of the contact geometry. We threshold both of the depth images to consider only pixels that are in more than 0.2 mm of penetration, then convert the remaining pixels into a point cloud in the gripper frame. We fuse the point clouds from the two tactile sensors, where their separation is given by the measured gripper opening. We register the pointcloud of the observed contact geometry against the object CAD model, where the initial transformation of the object CAD model is given by the best match from the discrete grid. In order to perform the registration, we use point-to-plane ICP. The point-to-plane ICP algorithm proceeds iteratively between two steps until convergence. The first step involves finding correspondences between transformed source and target pointclouds. The second step involves minimizing the objective function:

$$E(T) = \sum_{p,q \in K} ((p - Tq) \cdot n_p)^2 \qquad (1)$$

Where T is the transformation of the source point cloud, consisting of points q, and $n_p$ are the normals of points p of the target point cloud.

Force-Aware Insertion

We rely on a custom policy to perform force-aware insertion of industrial connectors, consisting of the moving the robot to align the estimated connector pose against a goal pose that is a nominal distance above the mating connector in the world frame, then moving the robot down in impedance mode until a force threshold is reached. We set the stiffness such that the motion in z-axis is stiff, and the motion in all other 5 axes (x, y, Rx, Ry, Rz) is compliant, in order to absorb a small amount of error that may accrue from either pose estimation or imprecision in the robot motion. We supervise the descent with wrist-mounted Force/Torque (F/T) signals, and formulate the motion as:

$$v_c = v_{ref} + g * F_z \qquad (2)$$

Where $v_c$ is the commanded velocity, vref is some maximum reference velocity, g is a gain value that is tuned per-connector depending on the required mating force (in practice, a gain value of 0.0125 was sufficient for all connectors we tested), and $F_z$ the projection of the measured F/T signal onto the world-z axis. This ensures that once a force threshold along the world z-axis is met, the robot stops moving and releases the connector.

Experimental Examples and Results

Insertion Experiments

Figures 4, 5:
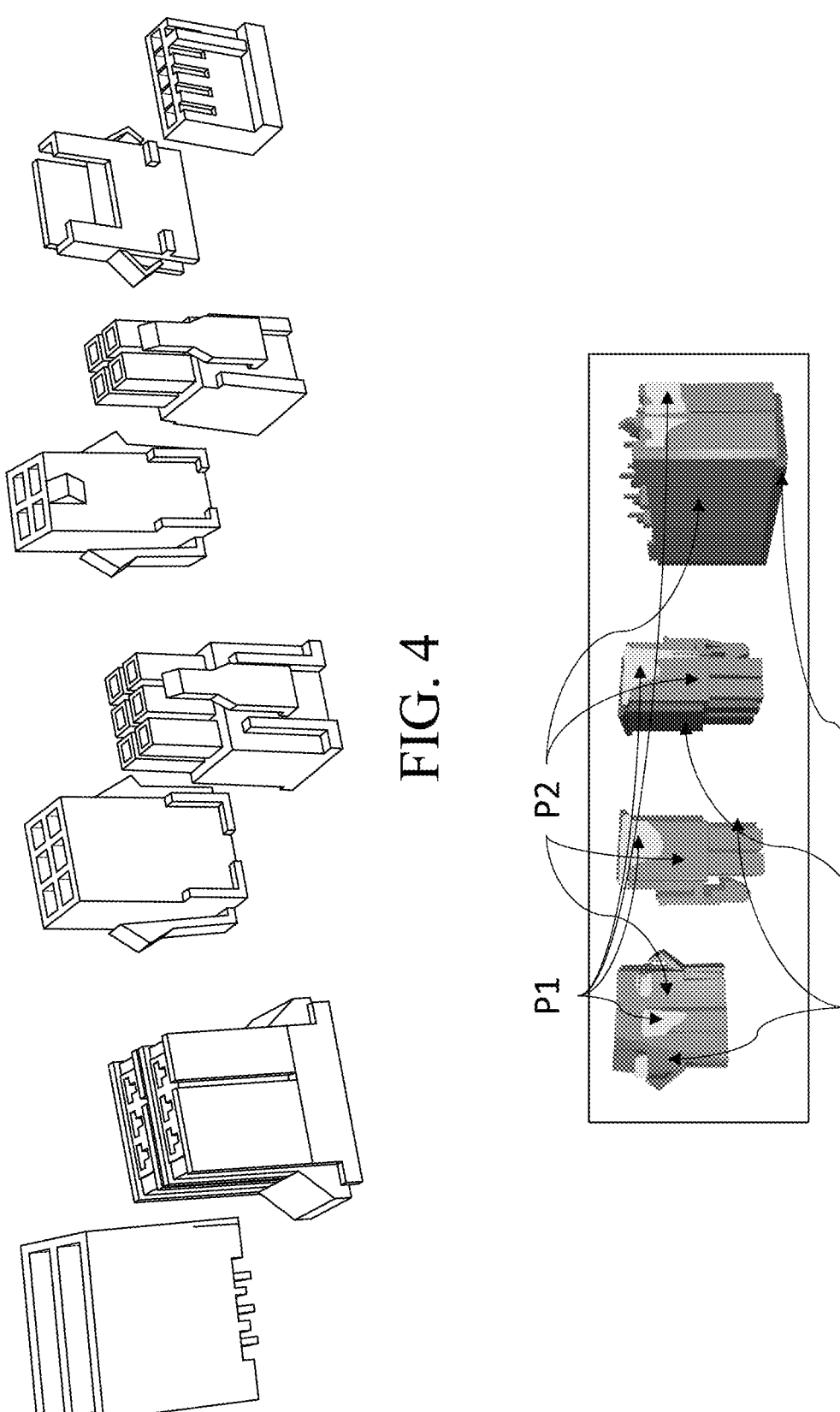
FIG. 4 shows examples of industrial connectors used for performing object insertion task according to some embodiments of the present invention.
FIG. 5 shows some qualitative results obtained according to some embodiments of the present invention.

FIG. 4 shows examples of industrial connectors used for performing object insertion task according to some embodiments of the present invention. We evaluate our method on four connectors. From left to right: black (21 mm×17 mm×21 mm), six (24 mm×12 mm×14 mm), four (24 mm×12 mm×10 mm), and M-connector (20 mm×8 mm×15 mm).

FIG. 5 shows some qualitative results obtained according to some embodiments of the present invention. In this figure, from left to right, qualitative pose estimation performance on M-connector, six, four, and black. The partial point cloud (P1) is reconstructed from the GelSight depth images, the (P3) shading is the pose of the best match from Depth2Pose, and the (P2) shading is the refined pose after ICP registration.

Figure 6:
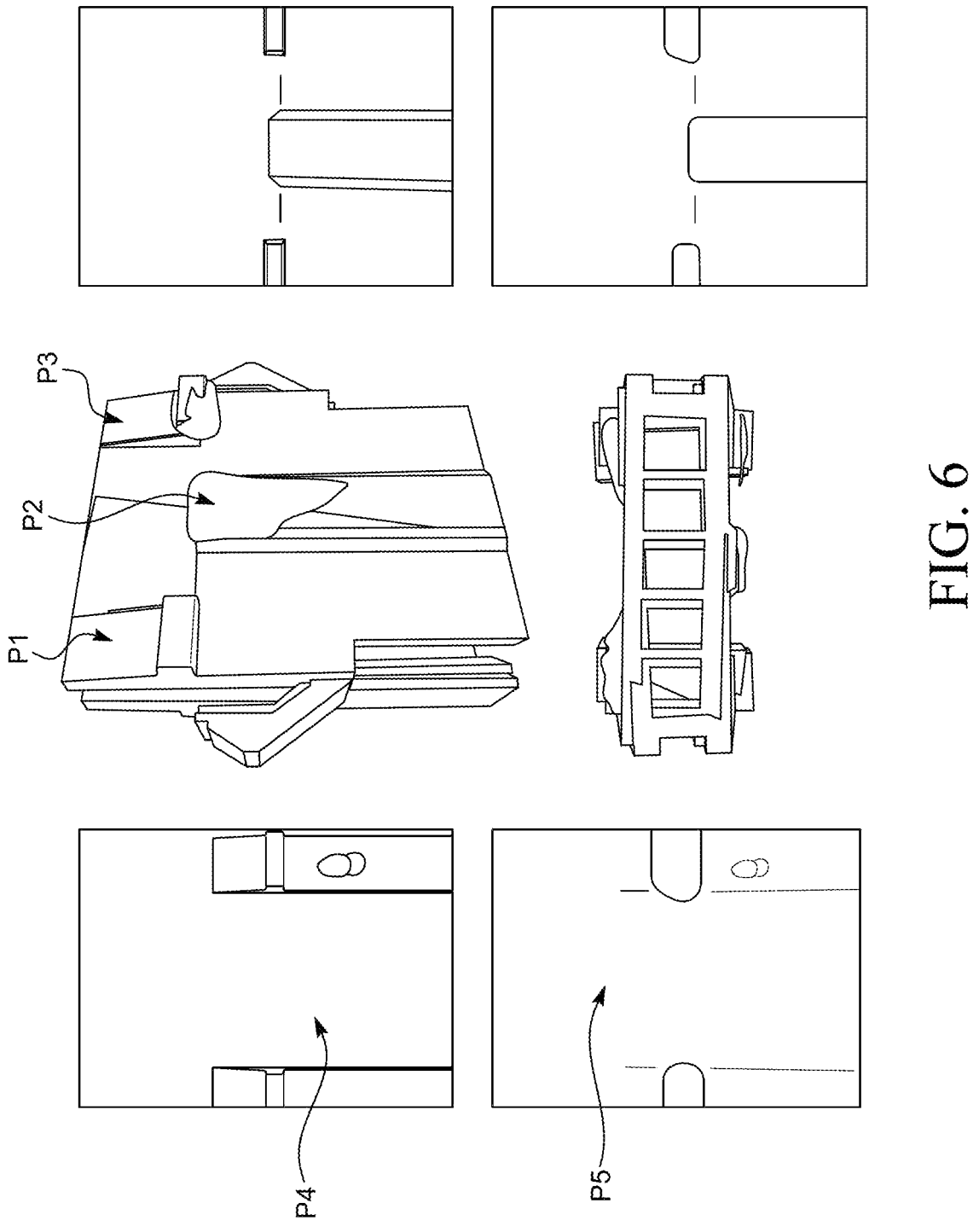
FIG. 6 shows comparisons for ICP Registration vs. Ground Truth, according to some embodiments of the present invention.

FIG. 6 shows comparisons for ICP Registration vs. Ground Truth, according to some embodiments of the present invention. In the figure, P1 shading indicates the idealized ground truth, P2 shading shows the object point-cloud sensed by the tactile sensors (partial observation of the connector), P3 shading corresponds to the refined pose of the connector computed by our algorithm. P4 represents the color image perceived by the tactile sensor, and P5 represents the 3D reconstruction of this color image into a depth map.

FIG. 7 shows some experimental results of Insertion Performance. The results are median values over 20 trials, where the results indicate median values over 20 trials. We perform 20 insertion trials for each connector and summarize the insertion success rate, pose error, peak insertion force, and cycle time (from the start of grasping to after releasing the connector once it has been inserted) in FIG. 7. Both M-connector and six succeed in all 20 trials, while four and black succeed in 19/20 trials. For the single failure case of black, the grasped connector was well-aligned and seated within the mating connector, but the robot supplied insufficient force to snap it into place. The failure case for four was more significant; the alignment error was enough that the robot released the grasped connector before it was seated within the mating connector.

To evaluate the pose error we rely on the ADD metric, where the object point cloud is transformed by the estimated and ground truth poses, and the average distance between corresponding points is computed. This metric implicitly accounts for both rotational and translational error in units of millimeters. We compare the pose error of the two-phase pose estimation pipeline with the pose error from matching to the discrete grid, and find a crucial improvement in accuracy for three of the four connectors. For M-connector, the decrease in accuracy when adding the two-phase pipeline is coincidental and driven by two factors: first, we happen to grasp the connector near to a pose that is contained within the discrete grid. Second, our 'ground truth' poses are idealized and approximate. We assume that grasps will be perfectly planar, which in practice does not occur. The sensor pads may deform non-uniformly, or the grasp center may be misaligned with the center of the connector, which can lead the connector to twist out-of-plane after the grasp. As demonstrated qualitatively in FIG. 4, the ICP match improves the pose estimate beyond our ability to ground truth. This is the case for the other three connectors as well, but the effect is masked by the high discrete error due to grasping far from any grid point.

To evaluate the impact of our design decisions on the insertion performance, we test three ablations of our method:

1. Depth2Pose Ablation: We turn off ICP and use the best match on the discrete grid as the pose estimate.
2. ICP Ablation: We randomly sample a pose from the discrete grid, and initialize ICP from this random pose.
3. Single-Sensor Ablation: We use only one of the tactile images with our two-phase pose estimation pipeline.

FIG. 8 shows some examples of Insertion Ablation Experiments according to some embodiments of the present invention. In the figure, the top line of each row shows the insertion success rate out of 10 trials, while the bottom line (in parenthesis) shows the median pose error in millimeters. Insertion Ablation Experiments. The top line of each row shows the insertion success rate out of 10 trials, while the bottom line (in parenthesis) shows the median pose error in millimeters.

We perform 10 trials for each ablation for each object. For the single-sensor ablation, we perform 5 trials with the tactile image from the left finger, and 5 trials with the tactile image from the right finger. The results are summarized in the figure.

The Depth2Pose ablation results in 0/10 successful insertions for all objects except for M-connector. Matching to the discrete grid results in a systematic amount of error, that is greater than the insertion tolerance. M-connector succeeds because we happen to grasp near enough to a discrete grid pose.

The results for the ICP ablation are also consistent across the connectors. Both M-connector and four succeed in 2/10 trials. For the successful M-connector trials, ICP registration reduced the error from 16.19 mm and 11.11 mm to 0.64 mm and 0.55 mm, respectively. The successful four trials have similar statistics. Because the size of the connectors is on the order of the size of the tactile sensors, the partial point clouds reconstructed from the tactile images give a somewhat global view of the connector geometry, such that in some cases ICP can recover from significant initialization errors. The requirement on the quality of the pose initialization is also a function of the insertion tolerance. Six fails in every trial, despite the fact that random initialization leads to 0.86 mm and 0.8 mm of error after registration in 2/10 trials. This is only slightly more error than when ICP is initialized from a close match on the discrete grid (FIG. 7), but makes the difference between success and failure. These results indicate that although ICP can in some cases recover from a large amount of pose error, close initialization is necessary for high-accuracy, repeatable results.

For the single-sensor ablation, M-connector fails in the five experiments that rely on the left tactile sensor—which contacts a more ambiguous portion of the connector—while the five experiments that rely on the right tactile sensor succeed with 0.65 mm of error. Black fails in 9/10 trials due to inaccuracy in the Depth2Pose match. Black has large, flat regions which do not penetrate the sensor deeply, resulting in weaker surface gradients and poorer tactile depth reconstruction. The real tactile depth images are consequently patchy and incomplete, which we do not model in our simulated depth images. These results together indicate that including two sensors can improve robustness to inherent ambiguity, as well as ambiguity that results from imperfect sim-to-real transfer. All trials fail for six despite reasonable estimation error. Relying on a single tactile sensor removes a constraint on the object pose, and ICP registration tends to put the connector in penetration with the other sensor, leading to more error than the assembly tolerance can accommodate. Four has slightly more error in the single contact case compared with the two-contact case (FIG. 7), but still within the assembly tolerance, and all 10 trials succeed. In total, the single-sensor ablation indicates that including information from both tactile sensors introduces more constraints that increase the likelihood of high-accuracy localization.

Figure 9:
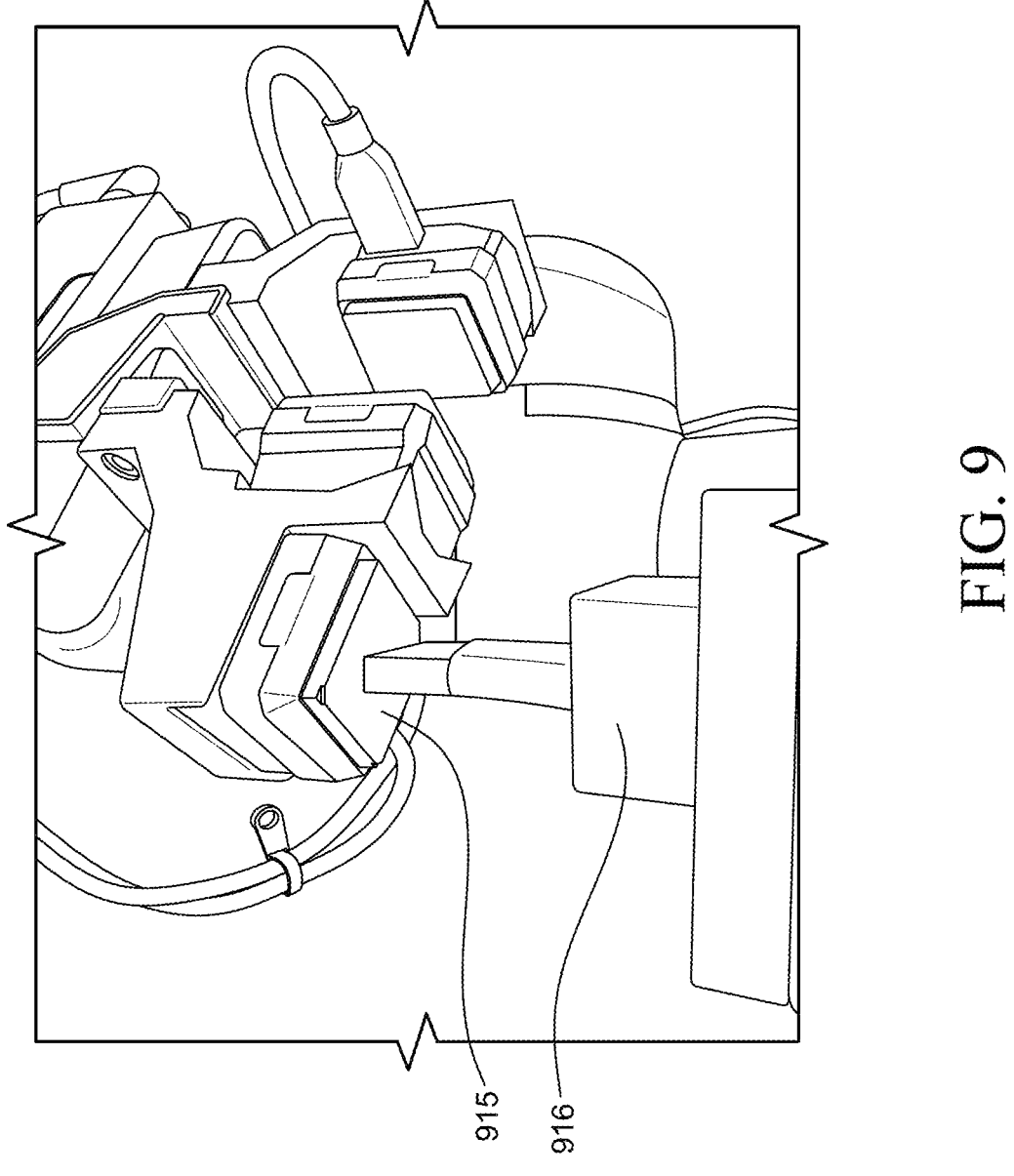
FIG. 9 shows an example of target pose estimation according to some embodiments of the present invention.

According to some embodiments of the present invention, industrial-grade assembly is characterized by tight fits between arbitrarily shaped parts, which is difficult to solve with existing approaches. In particular, vision-based pose estimation is generally insufficient to align mating parts well enough to assemble them without specialized insertion algorithms. This paper introduces a framework for industrial connector insertion based on high-accuracy pose estimation with image-based tactile sensors. Because the accuracy of our pose estimation framework is sufficiently high, we demonstrate an insertion success rate of 95-100% with only a simple control strategy. Additionally, we achieve this high success rate without relying on any real-world data or experience, instead learning object-dependent perception models from simulated data alone. FIG. 9 shows an example of target pose estimation according to some embodiments of the present invention. The figure shows that the mating connector (916) can be localized with a horizontal tactile sensor (915) for an end-to-end insertion system.

Accordingly, it is possible to leverage the same pose estimation framework to localize the mating connector as well (see FIG. 9), bringing us closer to an end-to-end assembly system. A key limitation of this work is its reliance on unique tactile imprints for unambiguous localization. In future work, we hope to develop a strategy for handling ambiguous contacts (i.e. partial/marginal grasps) by either detecting ambiguity and regrasping, or fusing information over multiple palpations.

Figure 10:
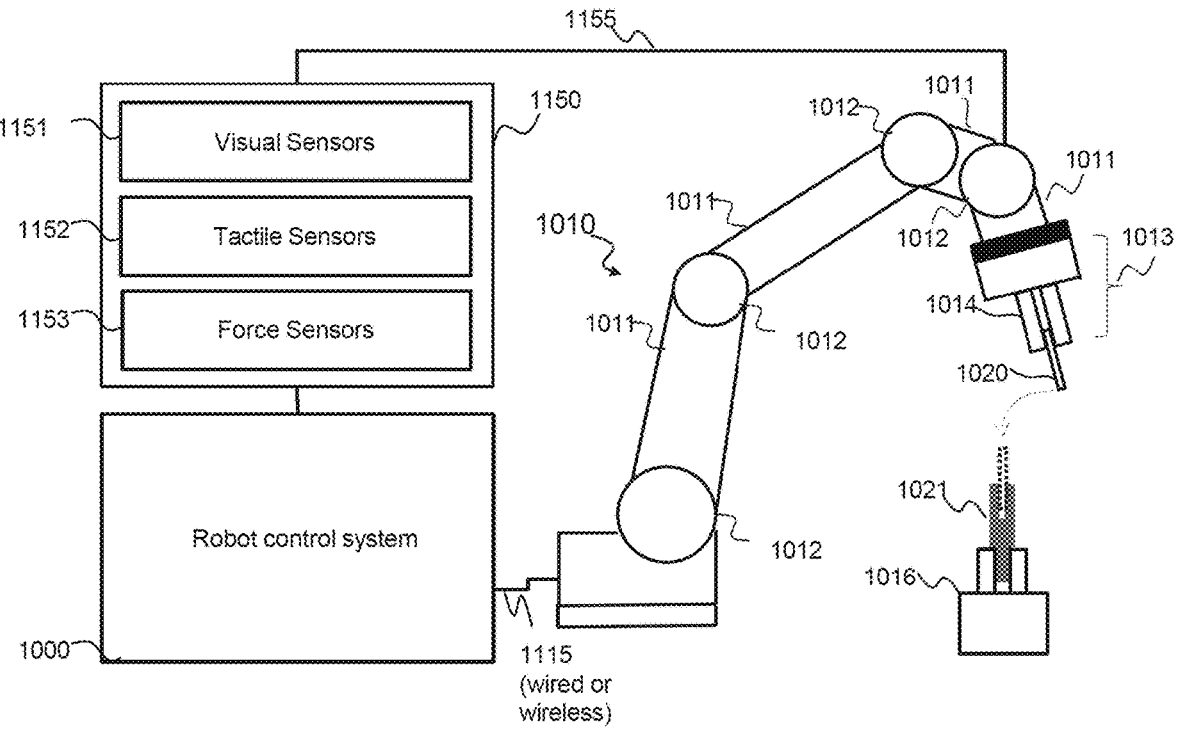
FIG. 10 shows our complete robotic system for high-accuracy tactile pose estimation of electronic connectors and robotic insertion of the in-hand connector into a mating connector situated in the robot's workspace, according to embodiments of the present invention.

FIG. 10 shows our complete robotic system for high-accuracy tactile pose estimation of electronic connectors, and robotic insertion of the in-hand connector into a mating connector situated in the robot's workspace. This is a diagram illustrating an example of a robot used in the preferred embodiment.

The figure shows the robotic control system 1000 according to some embodiments of the present disclosure with different sensing modalities which can be used in the system. The robot arm 1010 consists of a set of rigid links 1011, connected to each other by a set of joints 1012. In the described embodiment, the joints 1012 are revolutionary joints, but in another embodiment, they can be sliding joints, or other types of joints. The collection of joints 1012 determines the degrees of freedom for the robot arm 1010. The robot arm 1010 has six degrees of freedom, one for each joint 1012. The joints 1012 have embedded sensors configured to detect and transmit sensor signals (data) indicating the state of the joint. The state of the robot arm may include the angle of each joint 1012, the current, the velocity of each joint 1012, the torque of each joint 1012, the acceleration of each joint 1012, or any combination thereof. The state of the robot may also include the 3D position, velocity, and acceleration of each link 1011. The robot arm 1010 has a gripper 1013 with jaws 1014. The figure illustrates that the gripper grasps an object 1020 with the jaws 1014 and plans to insert the object 1020 in a mating object 1021 settled on a support 1016. The support 1016 can be a Printed Circuit Board, another cable or any device that supports rigidly the mating connector 1021. The robot 1010 is connected to the robot control system 1000 using interface cables 1115 and executes rotations of each joint 1012 that are commanded by the robot control system 1000. The state of the robot is measured by the feedback system 1150. The feedback system 1150 also comprises of the vision sensing system 1151, tactile sensing system 1152 and the force sensing system 1153. The robot 1010 is connected to the feedback system through the interface 1155. The feedback system 1050 is connected to the robot control system 1000. The feedback system transmits to the robot control system the feedback information which includes the state of the robot, the vision measurements, the tactile measurements and the force measurements.

An example of connector pose estimation and insertion: the vision system 1151 detects a connector 1020 and measures the location of connector 1020 with respect to the robot gripper 1013, process described in FIG. 3. The robot control system 1000 receives this information and sends commands to each joint 1012 of the robot 1010 such that the gripper moves to the location of connector 1020. Then the robot control system commands the gripper 1013 to close the jaws 1014. The tactile sensing system 1052 measures the tactile contact between the jaws and the connector 1020. The measurements include the relative 3D pose between the jaws and the connector 1020 with very high accuracy. The feedback system transmits the pose of the connector 1020 with respect to the jaws and the robot state including the 3D pose of the jaws with respect to the base of the robot. The robot control system 1000 computes the 3D pose of the connector 1020 with respect to the base of the robot. The 3D pose of the mating connector 1021 with respect to the robot base is already known by means of user programming or measurement, as described in FIG. 9. The robot control system computes 3D pose difference between connectors 1020 and 1021 and commands the robot joints 1012 such that the connector 1020 is aligned and positioned on top of the mating connector 1021. Then the robot control system commands the robot 1000 to move on the insertion axis. The force sensing system 1053 measures the insertion force and transmits the information to the robot control system. The robot control system further commands the robot using the force feedback and modulates the insertion force in closed-loop. When the force reaches a pre-determined threshold, the robot control system commands the gripper to release the connector 1020 and commands the robot to return to a home position after which it terminates the insertion operation.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

What is claimed is:

1. A pose controller for controlling a pose of an object to assemble with a mating object by a gripper of a robot arm having actuators controlled by a robot controller, the gripper including two fingers integrating tactile sensors contacting the object, comprising:

an interface configured to receive tactile signals from the tactile sensors and transmit a control signal to the actuators;

a processor; and a memory, in association with the processor, configured to store a precomputed set of tactile depth images and instructions of computer-implemented method, wherein each tactile depth image in the precomputed set corresponds to a simulated tactile depth image generated by a simulator by rendering a virtual depth camera view of a three-dimensional model of the object posed relative to the virtual depth camera, subtracting from each pixel of the rendered virtual depth image a distance value which is a sum of a distance between the virtual depth camera and a tactile sensor surface and penetration depth of the tactile sensors, and flooring positive pixel values to zero, and wherein the instructions of computer-implemented method cause the processor to perform steps of:

computing measured tactile depth images from the received tactile signals;

refining the pose of the object by matching between the precomputed set of tactile depth images and the measured tactile depth images by a point-to-plane iterative closest point (ICP) algorithm;

generating a gripper trajectory command based on the refined pose of the object and a target pose of the object, wherein the target pose is aligned against the mating object with a nominal distance above the mating object; and controlling the actuators of the robot arm according to a gripper trajectory by transmitting the gripper trajectory command to the robot controller.

2. The pose controller of claim 1, wherein the precomputed set of tactile depth images are precomputed contact pointclouds and the measured tactile depth images are measured pointclouds formed from the tactile signals.

3. The pose controller of claim 1, wherein when the tactile signals are based on red, green, and blue (RGB) tactile depth images, the measure tactile depth images of the object being grasped by the gripper are processed by a pre-trained neural network to extract surface normals of the object from the RGB tactile depth image, wherein Poisson reconstruction is performed on the extracted surface normals to generate the measured tactile depth images.

4. The pose controller of claim 1, wherein the two fingers are parallel jaw grippers, wherein each of the two fingers includes one or more tactile sensors.

5. The pose controller of claim 1, wherein the gripper trajectory is computed by the robot controller based on the gripper trajectory command.

6. The pose controller of claim 1, wherein the object and the mating object are connectors.

7. The pose controller of claim 1, wherein the robot controller operates the actuators to finalize assembling of the object and the mating object according to a force-aware insertion algorithm until a force threshold is reached.

8. A computer-implemented method for controlling a pose of an object to assemble with a mating object by a gripper of a robot arm having actuators, the gripper including two fingers integrating tactile sensors contacting the object, comprising steps of:

receiving tactile signals from the tactile sensors and transmit a control signal to the actuators;

providing a memory storing a precomputed set of tactile depth images, wherein each tactile depth image in the precomputed set corresponds to a simulated tactile depth image generated by a simulator by rendering a virtual depth camera view of a three-dimensional model of the object posed relative to the virtual depth camera, subtracting from each pixel of the rendered virtual depth image a distance value which is a sum of a distance between the virtual depth camera and a tactile sensor surface and penetration depth of the tactile sensors, and flooring positive pixel values to zero;

computing, using a processor, measured tactile depth images from the received tactile signals;

refining the pose of the object by matching between the precomputed set of tactile depth images and the measured tactile depth images by a point-to-plane iterative closest point (ICP) algorithm;

generating a gripper trajectory command based on the refined pose of the object and a target pose of the object, wherein the target pose is aligned against the mating object with a nominal distance above the mating object; and controlling the actuators of the robot arm according to a gripper trajectory by transmitting the gripper trajectory command to a controller of the actuators.

9. The computer-implemented method of claim 8, wherein the precomputed set of tactile depth images are precomputed contact pointclouds and the measured tactile depth images are measured pointclouds formed from the tactile signals.

10. The computer-implemented method of claim 8, wherein when the tactile signals are based on red, green, and blue (RGB) tactile depth images, the measure tactile depth images of the object being grasped by the gripper are processed by a pre-trained neural network to extract surface normals of the object from the RGB tactile depth image, wherein Poisson reconstruction is performed on the extracted surface normals to generate the measured tactile depth images.

11. The computer-implemented method of claim 8, wherein the two fingers are parallel jaw grippers, wherein each of the two fingers includes one or more tactile sensors.

12. The computer-implemented method of claim 8, wherein the gripper trajectory is computed by the robot controller based on the gripper trajectory command.

13. The computer-implemented method of claim 8, wherein the object and the mating object are connectors.

14. The computer-implemented method of claim 8, wherein the robot controller operates the actuators to finalize assembling of the object and the mating object according to a force-aware insertion algorithm until a force threshold is reached.

* * * * *